United States Patent
Bennett

(10) Patent No.: US 7,480,116 B1
(45) Date of Patent: Jan. 20, 2009

(54) DISK DRIVE EMPLOYING COARSE POSITION FEEDBACK FROM MECHANICAL POSITION SENSOR TO IMPROVE FORMAT EFFICIENCY

(75) Inventor: George J. Bennett, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 4 days.

(21) Appl. No.: 11/336,316

(22) Filed: Jan. 20, 2006

(51) Int. Cl.
*G11B 5/596* (2006.01)

(52) U.S. Cl. .................................. 360/77.03; 360/75

(58) Field of Classification Search ................ None
See application file for complete search history.

(56) References Cited

U.S. PATENT DOCUMENTS

| | | | |
|---|---|---|---|
| 3,808,254 | A | 4/1974 | Ha et al. |
| 4,396,959 | A | 8/1983 | Harrison et al. |
| 4,516,177 | A | 5/1985 | Moon et al. |
| 4,967,291 | A | 10/1990 | Touchton et al. |
| 4,974,109 | A | 11/1990 | Hoshimi et al. |
| 5,227,930 | A | 7/1993 | Thanos et al. |
| 5,270,886 | A * | 12/1993 | Nigam ............... 360/78.05 |
| 5,426,545 | A | 6/1995 | Sidman et al. |
| 5,442,172 | A | 8/1995 | Chiang et al. |
| 5,459,383 | A | 10/1995 | Sidman et al. |
| 5,471,304 | A | 11/1995 | Wang |
| 5,471,734 | A | 12/1995 | Hatch et al. |
| 5,563,868 | A | 10/1996 | Farnsworth et al. |
| 5,619,387 | A | 4/1997 | Ottesen et al. |
| 5,666,236 | A | 9/1997 | Bracken et al. |
| 5,784,219 | A | 7/1998 | Genheimer |
| 5,828,508 | A | 10/1998 | Whaley et al. |
| 5,831,786 | A | 11/1998 | Boutaghou et al. |
| 5,856,895 | A | 1/1999 | Schaenzer et al. |
| 5,909,333 | A | 6/1999 | Best et al. |
| 6,052,250 | A | 4/2000 | Golowka et al. |
| 6,054,833 | A | 4/2000 | Takeuchi |
| 6,064,540 | A | 5/2000 | Huang et al. |
| 6,072,655 | A | 6/2000 | Uwabo et al. |
| 6,075,667 | A | 6/2000 | Kisaka et al. |

(Continued)

OTHER PUBLICATIONS

UDT Sensors Inc., "Non-contact optical position sensing using silicon photodetectors", App Note No. 13, Apr. 1982, http://www.udt.com.

(Continued)

*Primary Examiner*—K. Wong
(74) *Attorney, Agent, or Firm*—Howard H. Sheerin, Esq.

(57) ABSTRACT

A disk drive is disclosed including a disk having a plurality of servo tracks. The servo tracks are banded together to form a plurality of servo track bands, and each servo sector comprises a fine track address that identifies one of the servo tracks. The disk drive further comprises a head attached to a distal end of an actuator arm operable to generate a read signal by reading the disk, and a mechanical position sensor operable to detect a coarse position of the actuator arm. The coarse position is processed to identify one of the servo track bands, and the read signal is processed to detect one of the fine track addresses, wherein the detected fine track address identifies a servo track within the identified servo track band. The identified servo track band is combined with the detected fine track address to generate a servo track address.

4 Claims, 12 Drawing Sheets

U.S. PATENT DOCUMENTS

| | | | |
|---|---|---|---|
| 6,091,564 | A | 7/2000 | Codilian et al. |
| 6,100,623 | A | 8/2000 | Huang et al. |
| 6,128,155 | A | 10/2000 | Sugawara et al. |
| 6,157,522 | A | 12/2000 | Murphy et al. |
| 6,169,382 | B1 | 1/2001 | McKenzie et al. |
| 6,233,106 | B1 | 5/2001 | Chambers |
| 6,304,398 | B1 | 10/2001 | Gaub et al. |
| 6,307,702 | B1 | 10/2001 | Fukushi et al. |
| 6,310,746 | B1 | 10/2001 | Hawwa et al. |
| 6,388,829 | B1 | 5/2002 | Nazarian |
| 6,396,652 | B1 | 5/2002 | Kawachi et al. |
| 6,407,876 | B1 | 6/2002 | Yamaguchi et al. |
| 6,407,877 | B1 * | 6/2002 | Mitani ............ 360/78.11 |
| 6,493,170 | B1 | 12/2002 | Kato et al. |
| 6,515,834 | B1 | 2/2003 | Murphy |
| 6,535,347 | B1 * | 3/2003 | Wakuda ............ 360/77.03 |
| 6,542,326 | B1 | 4/2003 | Ell et al. |
| 6,563,660 | B1 | 5/2003 | Hirano et al. |
| 6,583,948 | B1 * | 6/2003 | Taniguchi ............ 360/75 |
| 6,583,964 | B1 | 6/2003 | Huang et al. |
| 6,603,629 | B1 | 8/2003 | Tsai |
| 6,604,431 | B1 | 8/2003 | Soga et al. |
| 6,614,613 | B1 | 9/2003 | Huang et al. |
| 6,618,217 | B2 | 9/2003 | Heaton et al. |
| 6,618,218 | B1 | 9/2003 | Kadowaki et al. |
| 6,621,653 | B1 | 9/2003 | Schirle |
| 6,624,983 | B1 | 9/2003 | Berding |
| 6,631,047 | B2 | 10/2003 | Ishizuka et al. |
| 6,674,600 | B1 | 1/2004 | Codilian et al. |
| 6,690,551 | B2 | 2/2004 | Shiraishi et al. |
| 6,697,211 | B2 | 2/2004 | Koganezawa |
| 6,707,632 | B1 | 3/2004 | Raphael et al. |
| 6,747,834 | B1 | 6/2004 | Matsuyama |
| 6,781,778 | B1 | 8/2004 | Molstad et al. |
| 6,791,784 | B2 | 9/2004 | Edwards |
| 6,798,609 | B1 | 9/2004 | Bonin et al. |
| 6,816,334 | B2 | 11/2004 | Watanabe et al. |
| 6,829,118 | B1 | 12/2004 | Takamiya et al. |
| 6,831,808 | B2 | 12/2004 | Ottesen et al. |
| 6,888,694 | B2 | 5/2005 | Guo et al. |
| 6,914,745 | B2 | 7/2005 | Takeuchi et al. |
| 6,924,958 | B2 | 8/2005 | Vigna et al. |
| 6,934,117 | B2 | 8/2005 | Huang et al. |
| 6,943,978 | B1 | 9/2005 | Lee |
| 7,002,771 | B2 | 2/2006 | Christie, Jr. et al. |
| 7,019,938 | B2 | 3/2006 | Miyata et al. |
| 7,046,465 | B1 | 5/2006 | Kupferman |
| 7,154,689 | B1 | 12/2006 | Shepherd et al. |
| 7,170,705 | B2 | 1/2007 | Shimizu et al. |
| 7,209,311 | B2 | 4/2007 | Ueda et al. |
| 7,215,504 | B1 | 5/2007 | Bennett |
| 7,365,932 | B1 | 4/2008 | Bennett |
| 2002/0054451 | A1 | 5/2002 | Moon et al. |
| 2002/0109931 | A1 | 8/2002 | Vigna et al. |
| 2003/0002189 | A1 | 1/2003 | Ozdemir |
| 2003/0043710 | A1 | 3/2003 | Shelton et al. |
| 2003/0053244 | A1 | 3/2003 | Lewis |
| 2003/0133219 | A1 | 7/2003 | Ishizuka et al. |
| 2003/0147181 | A1 | 8/2003 | Shiraishi et al. |
| 2004/0001280 | A1 | 1/2004 | Ikedo et al. |
| 2004/0051993 | A1 | 3/2004 | Shin |
| 2004/0246833 | A1 | 12/2004 | Ehrlich |
| 2006/0119977 | A1 | 6/2006 | Zhu et al. |

OTHER PUBLICATIONS

M. Kobayashi et al., "Multi-Sensing Servo with Carriage-Acceleration Feedback for Magnetic Disk Drives", Proceedings of the American Control Conference, Jun. 1998, pp. 3038-3042.

F.Y. Huang et al., "Active Damping in HDD Actuator", IEEE Transactions on Magnetics, vol. 37, No. 2, Mar. 2001, pp. 847-849.

Office Action dated Sep. 21, 2006 from U.S. Appl. No. 11/253,400, 15 pages.

Notice of Allowance dated Jan. 24, 2007 from U.S. Appl. No. 11/253,400, 6 pages.

Office Action dated Jan. 9, 2007 from U.S. Appl. No. 11/323,251, 14 pages.

Notice of Allowance dated Jul. 10, 2007 from U.S. Appl. No. 11/323,251, 8 pages.

Notice of Allowance dated Dec. 13, 2007 from U.S. Appl. No. 11/323,251, 12 pages.

Office Action dated Apr. 17, 2008 from U.S. Appl. No. 11/322,907 (A1731), 34 pages.

Office Action dated Apr. 15, 2008 from U.S. Appl. No. 11/322,908 (A1732), 32 pages.

Office Action dated Oct. 30, 2008 from U.S. Appl. No. 11/322,908, 18 pages.

Notice of Allowance dated Nov. 10, 2008 from U.S. Appl. No. 11/322,907, 14 pages.

\* cited by examiner

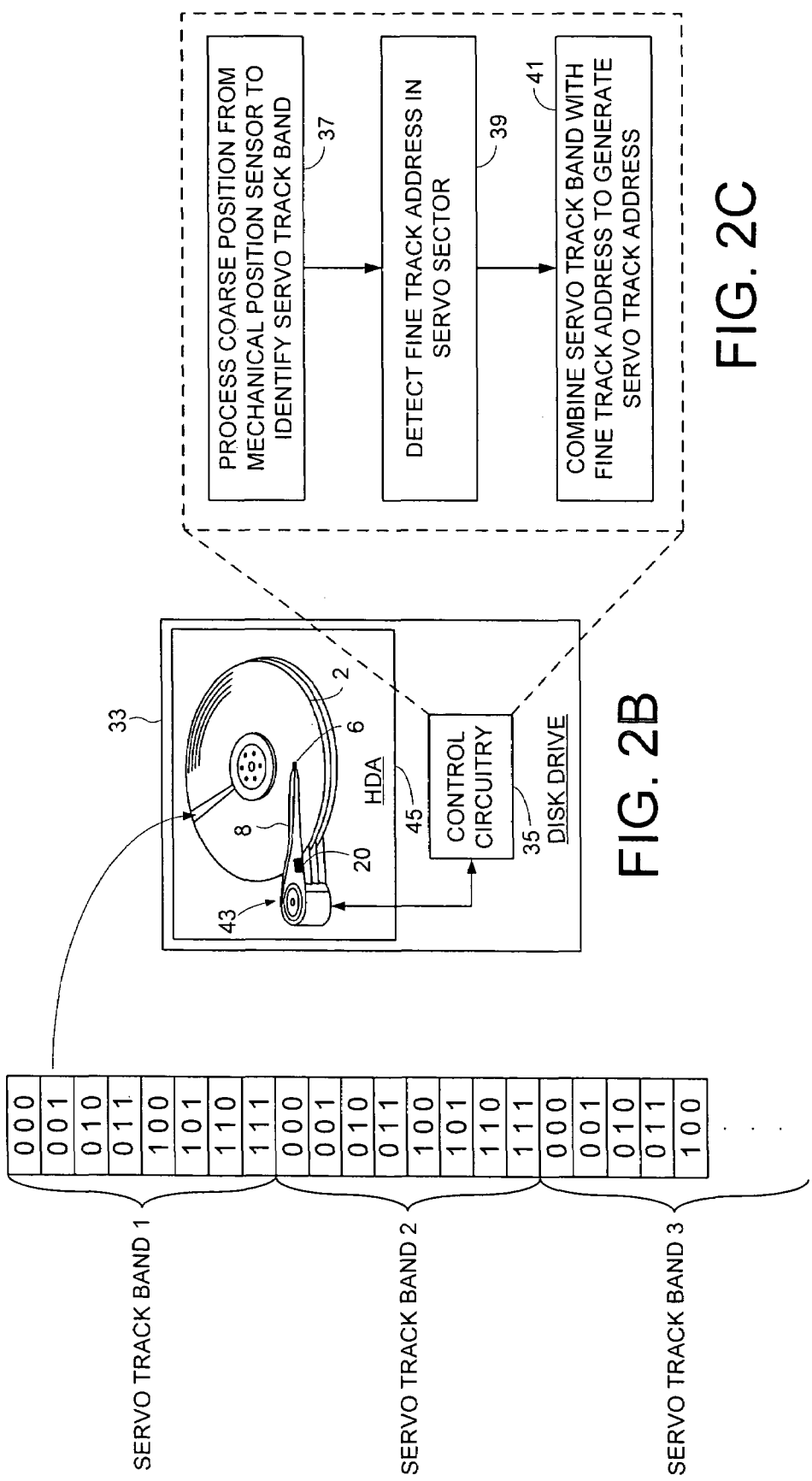

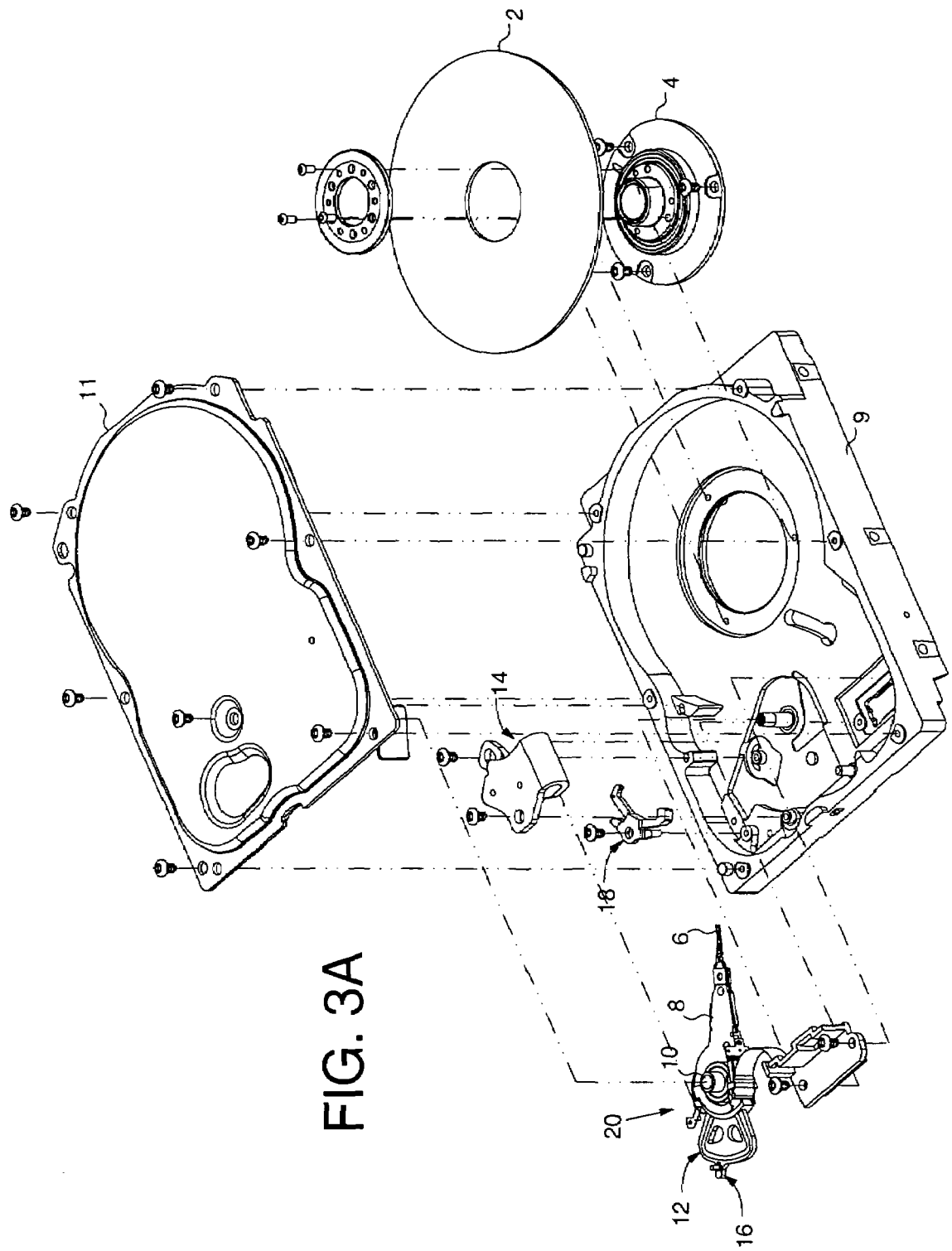

DISK DRIVE EMPLOYING COARSE POSITION FEEDBACK FROM MECHANICAL POSITION SENSOR TO IMPROVE FORMAT EFFICIENCY

BACKGROUND OF THE INVENTION

1. Field of the Invention

The present invention relates to disk drives for computer systems. More particularly, the present invention relates to a disk drive employing coarse position feedback from a mechanical position sensor to improve format efficiency.

2. Description of the Prior Art

FIG. 1A shows an exploded view of a prior art disk drive comprising a disk 2 rotated by a spindle motor 4, and a head 6 coupled to a distal end of an actuator arm 8 which is rotated about a pivot 10 by a voice coil motor (VCM) in order to actuate the head 6 over the disk 2. The disk 2, spindle motor 4, head 6, actuator arm 8, and VCM are enclosed in a head disk assembly (HDA) comprising a base 9 and a cover 11. The VCM comprises a voice coil 12 coupled to the base of the actuator arm 8 and one or more permanent magnets attached to a yoke 14. When the voice coil 12 is energized with current, the resulting magnetic flux interacts with the magnetic flux of the permanent magnets to generate a torque that rotates the actuator arm 8 about the pivot 10. A tang 16 attached to the actuator arm 8 interacts with a crash stop 18 to limit the stroke of the actuator arm 8, and also provides a latching mechanism (e.g., using a magnet) to maintain the actuator arm 8 in a latched position while the disk drive is powered down. Alternatively, the actuator arm 8 may be parked on a ramp located at the outer periphery of the disk 2 when the disk drive is powered down.

Servo sectors $21_0$-$21_N$ are written to the disk 2 to define a plurality of radially-spaced, concentric servo tracks 23 as shown in the prior art disk format of FIG. 1B. The servo tracks 23 define a number of data tracks, wherein each data track is partitioned into a plurality of data sectors and the servo sectors $21_0$-$21_N$ are considered "embedded" in the data sectors. Each servo sector (e.g., servo sector $21_4$) comprises a preamble 25 for synchronizing gain control and timing recovery, a sync mark 27 for synchronizing to a data field 29 comprising coarse head positioning information such as a servo track number, and servo bursts 31 which provide fine head positioning information. The coarse head position information is processed to position a head over a target data track during a seek operation, and the servo bursts 31 are processed to maintain the head over a centerline of the target data track while writing or reading data during a tracking operation.

The servo sectors $21_0$-$21_N$ reduce the format efficiency by consuming disk space that could otherwise be used for the data sectors. In addition, as the number of servo tracks is increased in order to increase the tracks per inch (TPI), the servo track address size increases due to the increased number of bits required to identify each servo track. Consequently, the servo sectors $21_0$-$21_N$ consume even more disk space per data track as the TPI increases.

There is, therefore, a need to improve the format efficiency of a disk drive by reducing the size of the servo sectors and therefore the amount of disk space consumed by the servo sectors.

SUMMARY OF THE INVENTION

An embodiment of the present invention comprises a disk drive including a disk having a plurality of servo sectors with servo bursts for defining a plurality of servo tracks. The servo tracks are banded together to form a plurality of servo track bands, and each servo sector comprises a fine track address that identifies one of the servo tracks. The disk drive further comprises an actuator arm, a head attached to a distal end of the actuator arm operable to generate a read signal by reading the disk, and a mechanical position sensor operable to detect a coarse position of the actuator arm. Control circuitry within the disk drive is operable to process the coarse position to identify one of the servo track bands, process the read signal to detect one of the fine track addresses, wherein the detected fine track address identifies a servo track within the identified servo track band, and combine the identified servo track band with the detected fine track address to generate a servo track address.

In one embodiment, the mechanical position sensor comprises an optical sensor.

In another embodiment, the control circuitry is further operable to calibrate the mechanical position sensor by positioning the head over a predetermined location within a servo track band and processing a corresponding coarse position detected by the mechanical position sensor. In one embodiment, the control circuitry calibrates the mechanical position sensor by positioning the head over a servo track band near one of the inner diameter or outer diameter of the disk, positioning the head over a predetermined location within the servo track band by processing fine track addresses detected in the servo sectors, processing the corresponding coarse position detected by the mechanical position sensor, and moving the head radially over the disk to a next servo track band by processing fine track addresses and repeating the calibration for the next servo track band.

In another embodiment, the control circuitry is further operable to identify a margin band at the ends of each servo track band, and to use the margin band to recalibrate the mechanical position sensor. In one embodiment, the control circuitry is further operable to identify each margin band by processing the fine track addresses detected while calibrating the mechanical position sensor.

In still another embodiment of the present invention, the control circuitry is further operable to execute a disk access command by performing a seek operation to seek the head to a target servo track, and calibrate the mechanical position sensor during the seek operation. In another embodiment, the control circuitry is further operable to execute a disk access command by performing a tracking operation to maintain the head along a circumferential path relative to a target servo track, and calibrate the mechanical position sensor during the tracking operation.

In yet another embodiment, the control circuitry is further operable to detect a physical shock to the disk drive in response to the mechanical position sensor. In one embodiment, the control circuitry is further operable to disable a write operation if the physical shock is detected.

Another embodiment of the present invention comprises a method of operating a disk drive, the disk drive including a disk having a plurality of servo sectors with servo bursts for defining a plurality of servo tracks. The servo tracks are banded together to form a plurality of servo track bands, and each servo sector comprises a fine track address that identifies one of the servo tracks. The disk drive further comprises an actuator arm, a head attached to a distal end of the actuator arm operable to generate a read signal by reading the disk, and a mechanical position sensor operable to detect a coarse position of the actuator arm. The method comprises the steps of processing the coarse position to identify one of the servo track bands, processing the read signal to detect one of the fine track addresses, wherein the detected fine track address identifies a servo track within the identified servo track band, and combining the identified servo track band with the detected fine track address to generate a servo track address.

BRIEF DESCRIPTION OF THE DRAWINGS

FIG. 2A shows a disk format according to an embodiment of the present invention wherein the servo sectors comprise a truncated track address (fine track address), and the servo tracks are banded together into servo track bands.

FIG. 2B shows a disk drive according to an embodiment of the present invention comprising control circuitry and a mechanical position sensor for generating a coarse position of the head relative to the servo track bands.

FIG. 2C is a flow diagram executed by the control circuitry for detecting a servo track band using the mechanical position sensor, detecting a fine track address by processing the read signal, and combining the servo track band with the fine track address to generate a servo track address.

FIG. 3A shows a disk drive according to an embodiment of the present invention wherein the mechanical position sensor comprises an optical sensor for detecting a position of the actuator arm.

DESCRIPTION OF THE PREFERRED EMBODIMENTS

Figure 1A:
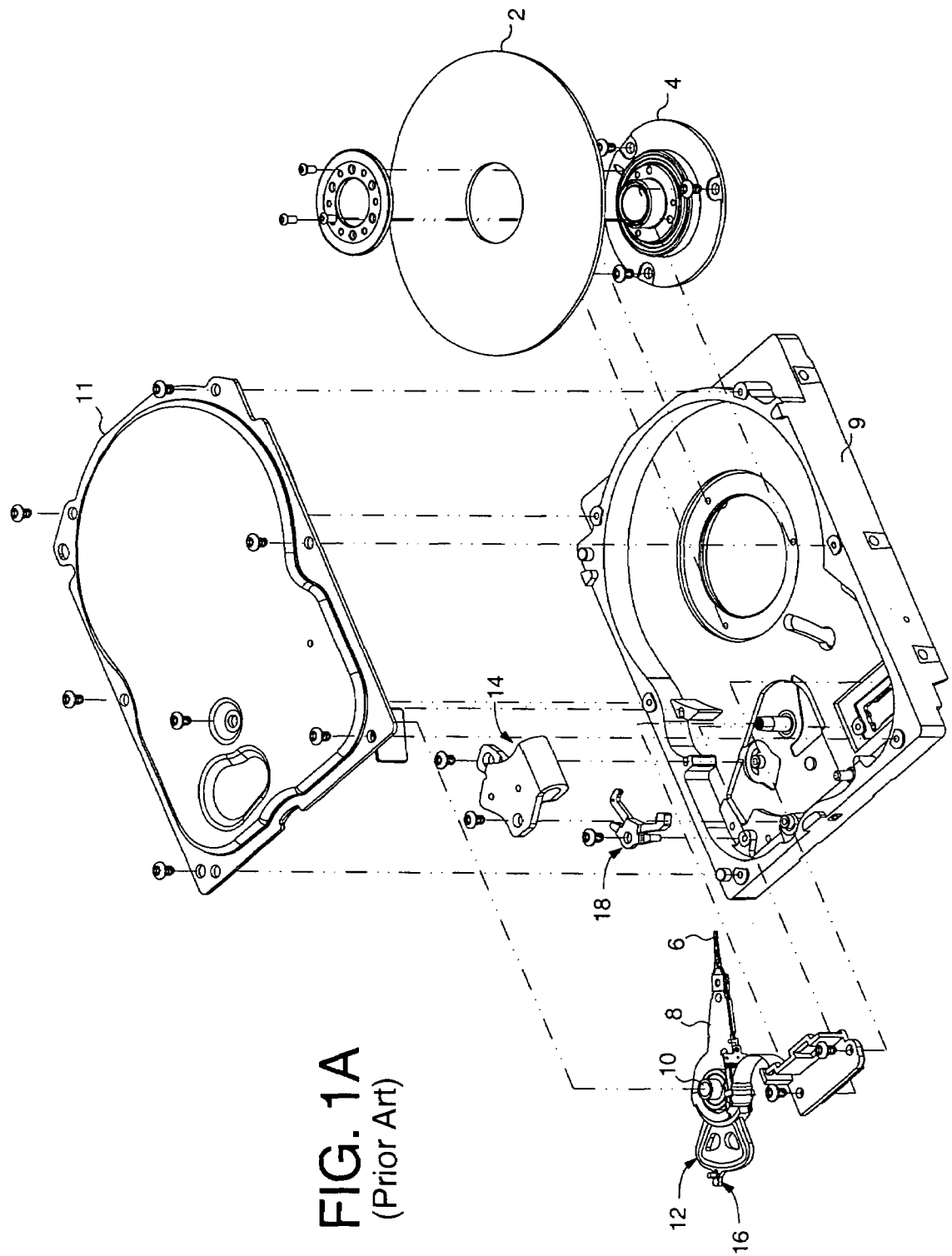
FIG. 1A shows a prior art disk drive comprising a head actuated over a disk by a voice coil motor in response to servo sectors recorded on the disk.
Figure 1B:
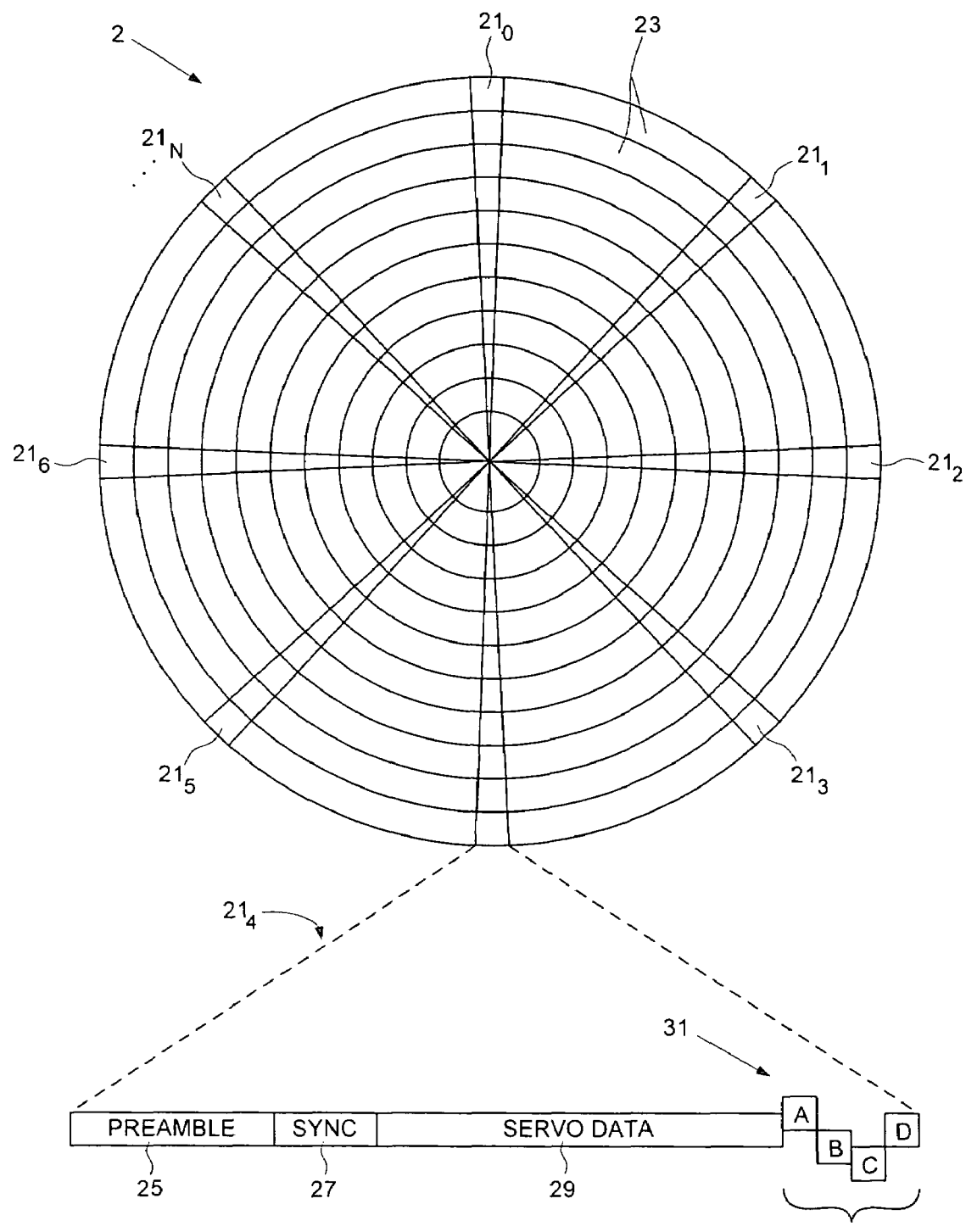
FIG. 1B shows a prior art disk format wherein the servo sectors comprise a plurality of servo bursts that define a plurality of radially spaced, concentric servo tracks.

FIG. 2B shows a disk drive 33 according to an embodiment of the present invention comprising a disk 2 having a plurality of servo sectors with servo bursts for defining a plurality of servo tracks. The servo tracks are banded together to form a plurality of servo track bands (FIG. 2A), and each servo sector comprises a fine track address that identifies one of the servo tracks. The disk drive 33 further comprises an actuator arm 8, a head 6 attached to a distal end of the actuator arm 8 operable to generate a read signal by reading the disk 2, and a mechanical position sensor 20 operable to detect a coarse position of the actuator arm 8. Control circuitry 35 within the disk drive 33 executes the flow diagram of FIG. 2C, and at step 37 processes the coarse position to identify one of the servo track bands, at step 39 processes the read signal to detect one of the fine track addresses, wherein the detected fine track address identifies a servo track within the identified servo track band, and at step 41 combines the identified servo track band with the detected fine track address to generate a servo track address.

Any suitable control circuitry may be employed to implement the described embodiments of the present invention. In one embodiment, the control circuitry comprises a microprocessor executing instructions which may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 2 and read into a volatile semiconductor memory when the disk drive is powered on. In yet another embodiment, the control circuitry comprises suitable logic circuitry, such as state machine circuitry. In still another embodiment, the control circuitry comprises suitable discrete-time circuitry and/or analog circuitry.

In the embodiment of FIG. 2B, the actuator arm 8 is rotated about a pivot by a voice coil motor 43 in order to actuate the head 6 radially over the disk 2. The disk 2, head 6, actuator arm 8, and voice coil motor 43 are enclosed in a head disk assembly (HDA) 45, wherein the control circuitry 35 is mounted on a printed circuit board coupled to the HDA 45. In one embodiment, the mechanical position sensor 20 is also completely enclosed in the HDA 45, and in an alternative embodiment, all or part of the mechanical position sensor 20 is located outside of the HDA 45 wherein the HDA comprises 45 suitable access (e.g., a window) to facilitate operation of the mechanical position sensor 20.

In the embodiment of FIG. 2A, each servo track band comprises eight servo tracks each identified by one of eight fine track addresses. The fine track addresses are illustrated in FIG. 2A as comprising three bits sequencing from 000 to 111. In one embodiment, each fine track address is encoded into a Gray coded track address, wherein the binary values are re-ordered so that only one bit changes between servo tracks as is well known in the art. Any suitable number of servo tracks may be selected for the servo track bands, wherein the fewer number of servo tracks per servo track band, the fewer number of bits required to record the fine track address and the better the format efficiency. Conversely, the reliability of detecting the correct servo track is increased by increasing the number of servo tracks per servo track band. That is, increasing the number of fine track addresses per servo track band decreases the chances of detecting the wrong servo track band using the mechanical position sensor 20.

Any suitable mechanical position sensor 20 may be employed in the embodiments of the present invention, such as a Hall effect sensor or a capacitive sensor. The sensor 20 may be more or less accurate. In the embodiments described herein, the mechanical position sensor 20 preferably has a resolution of at least 4 servo tracks. In other embodiments, in order to achieve even greater format efficiency (or greater redundancy), the sensor 20 may be chosen to be even more accurate.

Figure 3B:
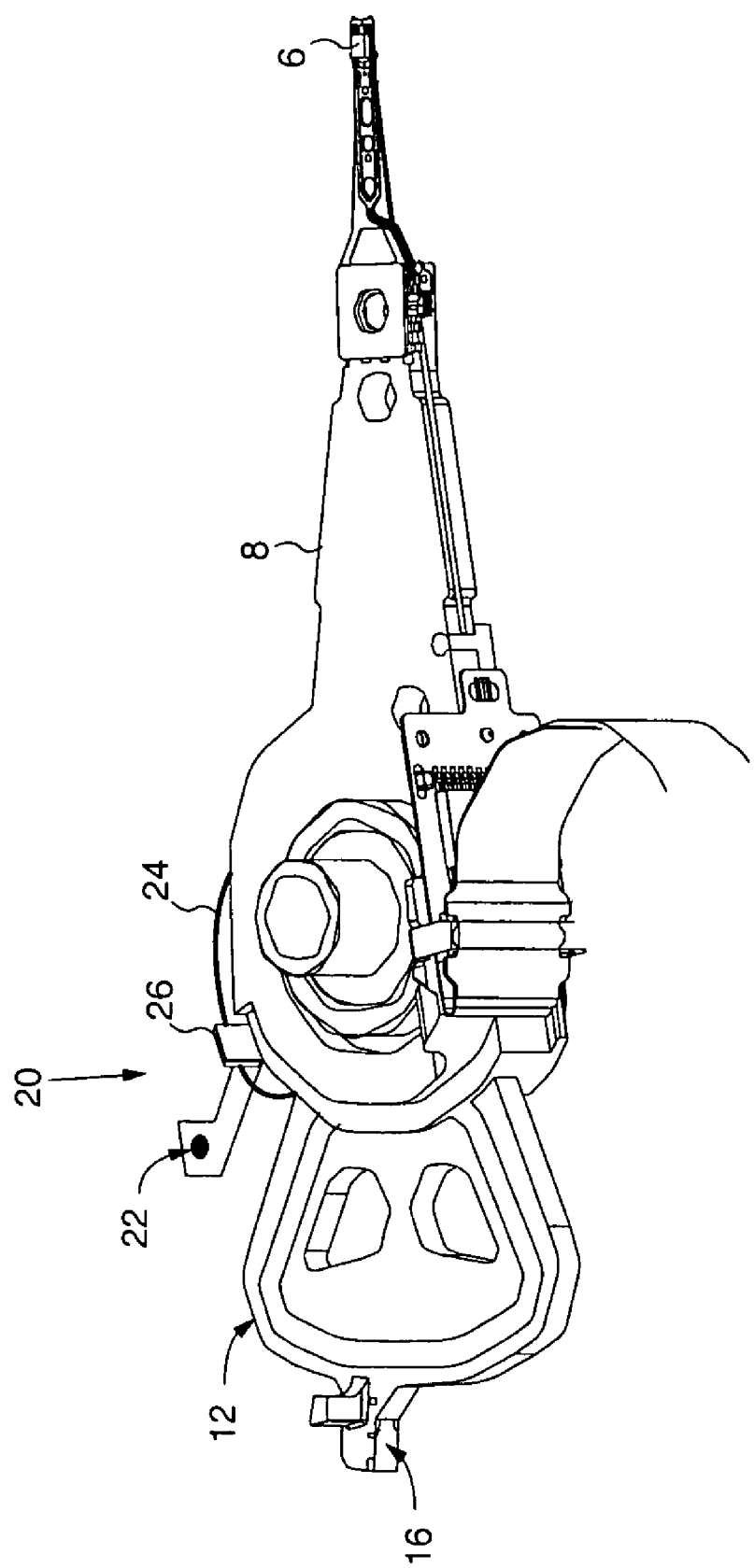
FIG. 3B shows an actuator arm according to an embodiment of the present invention wherein the optical sensor comprises a light source, a plurality of light sensitive sensors, and an opaque element positioned between the light source and the light sensitive sensors.

FIG. 3A shows a disk drive according to an embodiment of the present invention wherein the mechanical position sensor 20 comprises an optical sensor 20. Any suitable optical sensor 20 may be employed in embodiments of the present invention, such as a diffraction grating optical sensor or a gray-scale pattern optical sensor. FIG. 3B shows an embodiment of an optical sensor 20 comprising a light source 22, a plurality of light sensitive sensors 26 positioned to receive light from the light source 22, and a substantially opaque element 24 positioned between the light source 22 and the light sensitive sensors 26 configured to control an amount of light at least one of the plurality of light sensitive sensors 26 detects relative to the position of the actuator arm 8. The light source 22 comprises a light emitting device, such as a light emitting diode (LED), that is stationary relative to the base 9. The opaque element 24 comprises a linear element, such as a wire, coupled to the actuator arm 8. The light source 22 and light sensitive sensors 26 are aligned substantially horizontally with respect to the surface of the disk 2 (and the planar surface of the actuator arm 8). The light sensitive sensors 26 are stationary relative to the base 9 such that the opaque element 24 moves with the actuator arm 8 relative to the light sensitive sensors 26, thereby changing the amount of light each light sensitive sensor 26 detects.

Figure 4A:
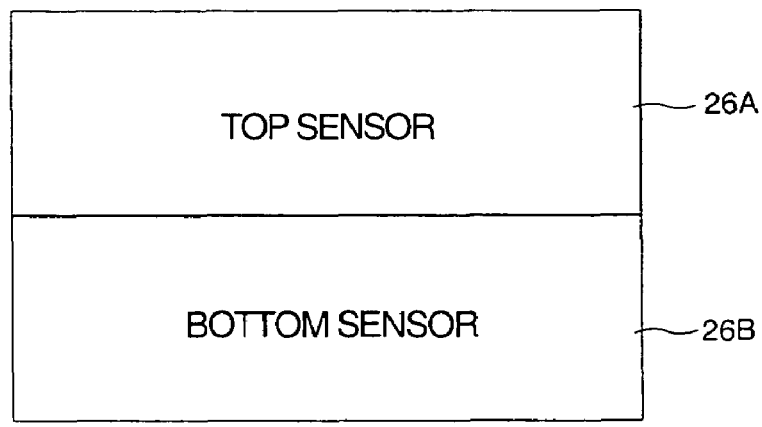
FIG. 4A shows an embodiment of the present invention wherein the plurality of light sensitive sensors comprise top and bottom sensors.

In the embodiment of FIG. 3B, the light sensitive sensors 26 comprise a top sensor 26A and a bottom sensor 26B as illustrated in FIG. 4A. Any suitable light sensitive sensor 26 may be employed in the embodiments of the present invention, such as a photo resistor, a charge-coupled device (CCD), a CdS/CdSe photo sensor, or a silicon based photovoltaic cell (photodiode). A light sensitive sensor 26 having a high bandwidth (e.g., a photovoltaic cell) may be preferred depending on the application. The light sensitive sensors 26A and 26B are shown adjacent one another in the embodiment of FIG. 4A, and may be integrated into a single component (e.g., separate regions of a CCD or CdS/CdSe photo sensor). In an alternative embodiment, the light sensitive sensors 26A and 26B may be manufactured as separate components and may also be separated by any suitable distance.

Figure 4B:
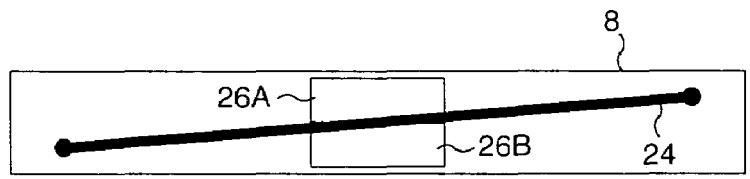
FIGS. 4B-4D illustrate how the opaque element controls the amount of light each sensor detects relative to the position of the actuator arm according to an embodiment of the present invention.
Figure 4C:
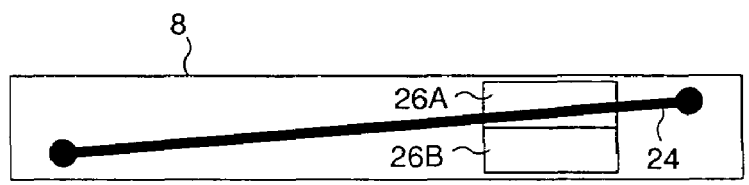
Figure 4D:
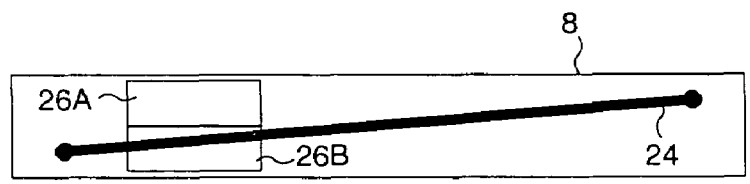

Operation of the optical sensor 20 shown in FIG. 3B is illustrated in FIGS. 4B-4D, which show a side view of the actuator arm 8 from the perspective of the light emitting device 22 looking toward the light sensitive sensors 26A and 26B. In this embodiment, the opaque element 24 (a linear element) has a sloping angle with respect to the actuator arm 8. In FIG. 4B, the actuator arm 8 is positioned near the middle of its stroke such that each light sensitive sensor 26A and 26B receives an equal amount of light. In FIG. 4C, the actuator arm 8 is rotated in one direction (e.g., toward the OD) such that the bottom sensor 26B receives more light than the top sensor 26A, and in FIG. 4D the actuator arm 8 is rotated in the opposite direction (e.g., toward the ID) such that top sensor 26A receives more light than the bottom sensor 26B.

Although the opaque element 24 is shown in the embodiment of FIG. 3B as comprising a linear element having a sloping angle, the opaque element 24 may comprise any suitable shape, such as a planar shape. In another embodiment, the opaque element 24 may comprise one or more apertures for controlling an amount of light passing through the opaque element 24. In addition, the opaque element 24 may comprise any suitable orientation with respect to the actuator arm 8 and light sensitive sensors 26. For example, the opaque element 24 may be curved rather than linear.

Figure 5A:
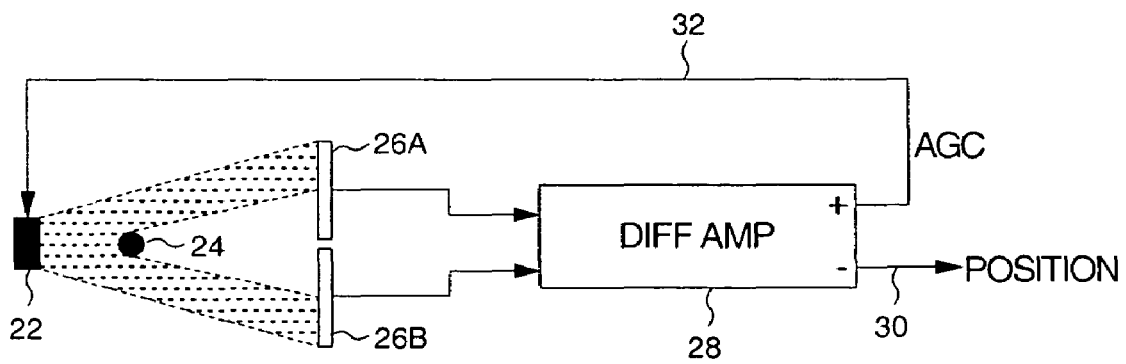
FIG. 5A shows an embodiment of the present invention wherein a differential amplifier computes a difference between the sensor outputs representing the position of the actuator arm, and the sum of the sensor outputs used to control an intensity of the light.

In one embodiment, the output of the light sensitive sensors 26 is used to adjust the intensity of the light emitted by the light source in an automatic gain controlled (AGC) loop. FIG. 5A shows an embodiment of the present invention wherein a differential amplifier 28 computes a difference between a first amount of light detected by the first sensor 26A and a second amount of light detected by the second sensor 26B, wherein the difference 30 represents the position of the actuator arm 8. Also in the embodiment of FIG. 5A, the differential amplifier 28 computes a sum 32 of the first amount of light detected by the first sensor 26A and the second amount of light detected by the second sensor 26B, wherein an intensity of the light emitted by the light source is controlled in response to the sum 32 in an AGC loop.

Figure 5B:
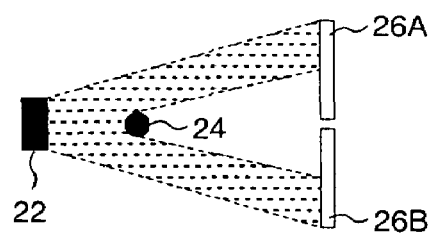
FIGS. 5B-5D illustrate how the amount of light each sensor detects changes relative to the position of the actuator arm according to an embodiment of the present invention.
Figure 5C:
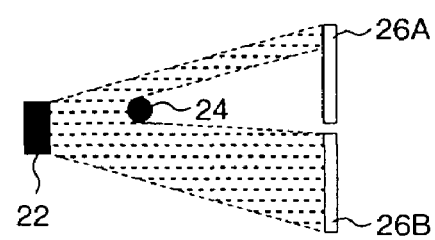
Figure 5D:
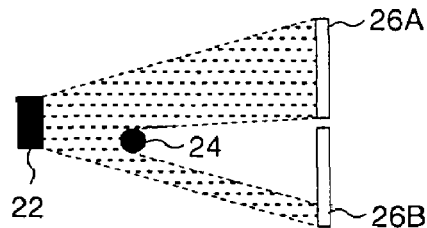

FIGS. 5B-5D correspond to FIGS. 4B-4D and illustrate how the position of the opaque element 24 changes to control the amount of light each light sensitive sensor detects relative to the position of the actuator arm 8. FIG. 5B shows that both light sensitive sensors 26A and 26B receive the same amount of light when the actuator arm 8 is near the middle of its stroke, FIG. 5C shows that bottom sensor 26B receives more light as the actuator arm 8 moves toward the OD, and FIG. 5D shows that the top sensor 26A receives more light as the actuator moves toward the ID. The difference between the amount of light each sensor detects therefore represents the position of the actuator arm 8.

Figure 6A:
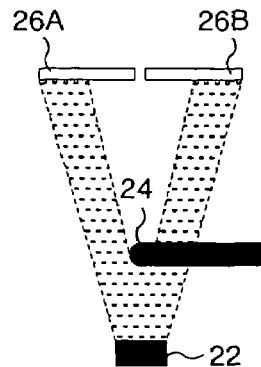
FIGS. 6A-6D illustrate an alternative embodiment of the present invention wherein the light source and light sensitive sensors are aligned vertically with respect to the surface of the disk.
Figure 6B:
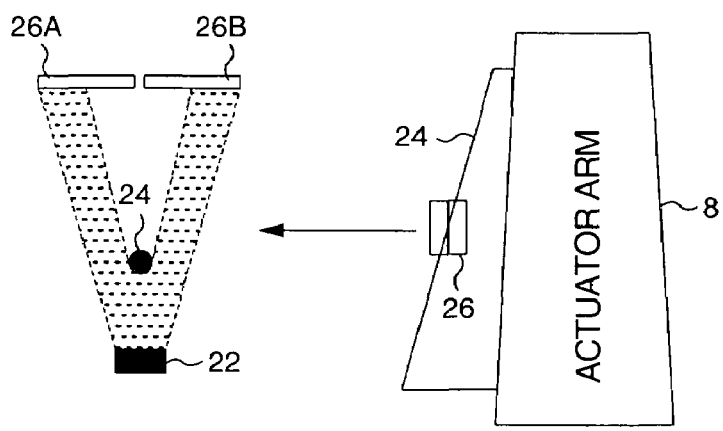
Figure 6C:
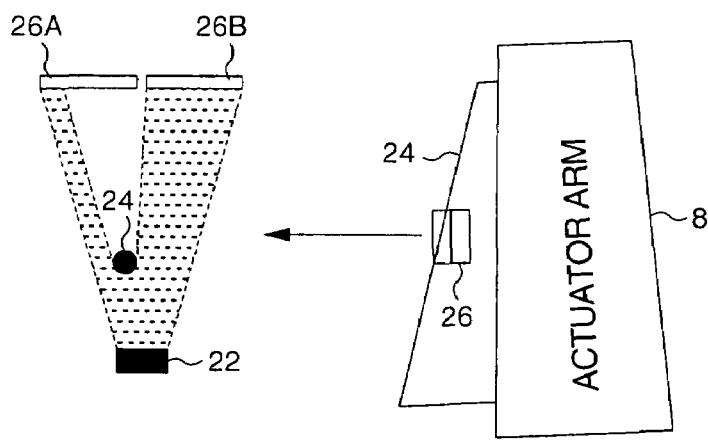
Figure 6D:
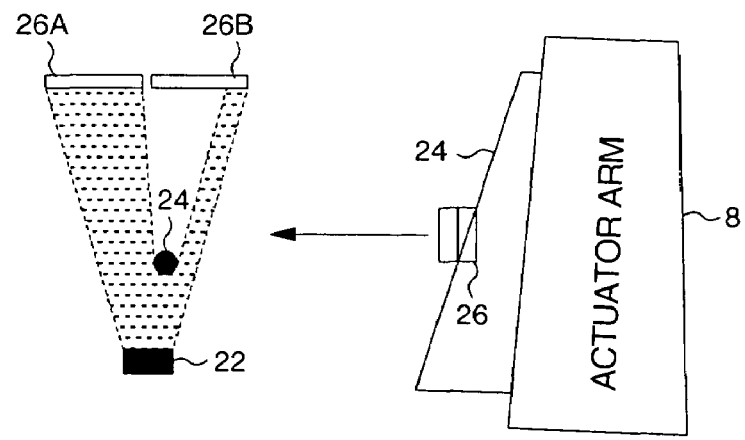

Any suitable configuration for the light source and light sensitive sensors may be employed in the embodiments of the present invention. FIG. 6A shows an alternative embodiment of the present invention wherein the light source (e.g., LED 22) and light sensitive sensors 26A and 26B are aligned substantially vertically with respect to the disk 2 (and planar surface of the actuator arm 8). FIGS. 6B-6D illustrate how the amount of light each light sensitive sensor 26A and 26B detects changes with the changing position of the actuator arm 8. FIGS. 6B-6D also illustrate an alternative shape for the opaque element 24, however, any suitable shape may be employed.

Figure 7A:
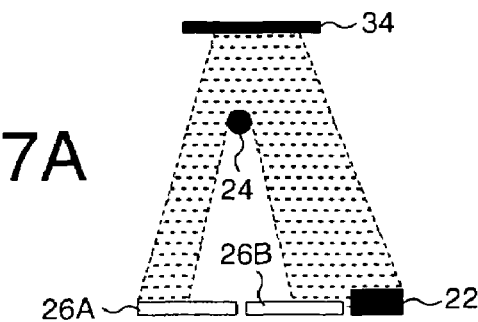
FIG. 7A illustrates an embodiment of the present invention wherein the light source comprises a light emitting device and a mirror.
Figure 7B:
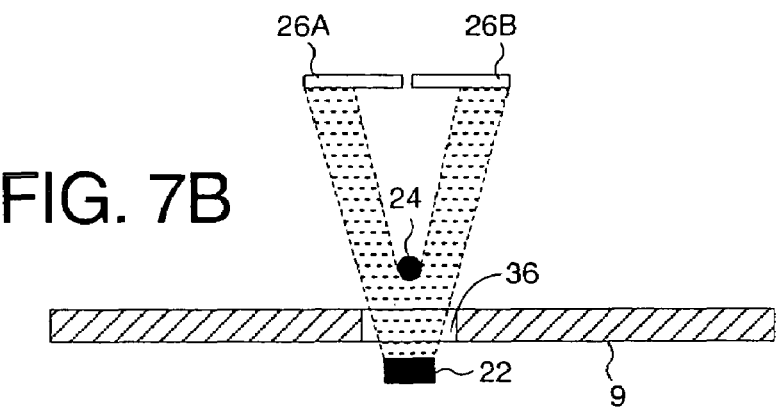
FIG. 7B shows an embodiment of the present invention wherein the HDA comprises a window, wherein the light passes through the window.
Figure 7C:
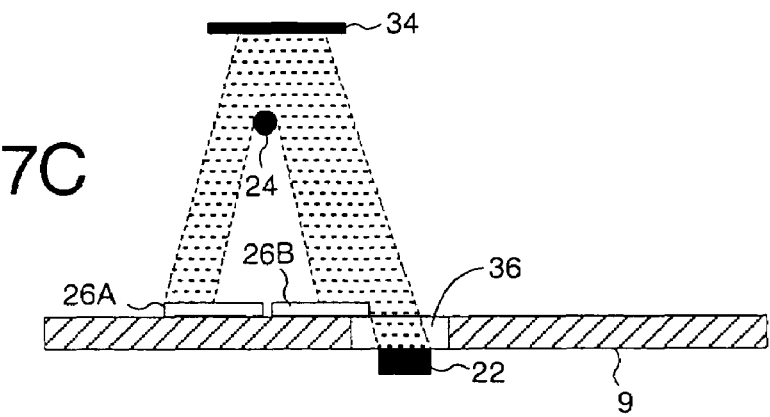
FIG. 7C shows an embodiment of the present invention wherein the light sensitive sensors are located inside the HDA.
Figure 7D:
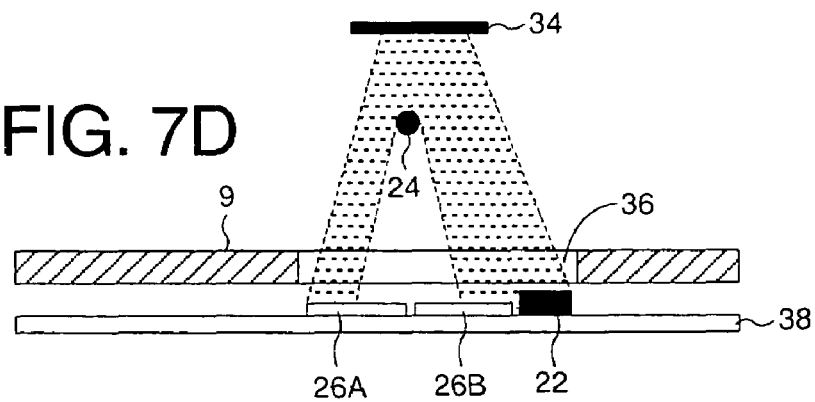
FIG. 7D shows an embodiment of the present invention wherein the light source and light sensitive sensors are mounted on a printed circuit board outside the HDA.

FIG. 7A illustrates another alternative configuration for the light source and light sensitive sensors. In this embodiment, the light source comprises a light emitting device 22 (e.g., an LED) and a mirror 34 for reflecting the light toward the light sensitive sensors 26A and 26B. FIG. 7B shows yet another configuration wherein the base 9 of the HDA comprises a window 36, and the light emitted by the light emitting device 22 passes through the window 36. This allows the light emitting device 22 to be located outside of the HDA. FIG. 7C shows an embodiment employing the mirror 34 of FIG. 7A and the window 36 of FIG. 7B, wherein the light sensitive sensors 26A and 26B are located inside the HDA. FIG. 7D shows an embodiment wherein both the light emitting device 22 and the light sensitive sensors 26A and 26B are mounted on a printed circuit board 38 located outside the HDA. In this embodiment, the light passes through the window 36, reflects off of the mirror 34, and then passes back through the window 36.

Figure 8:
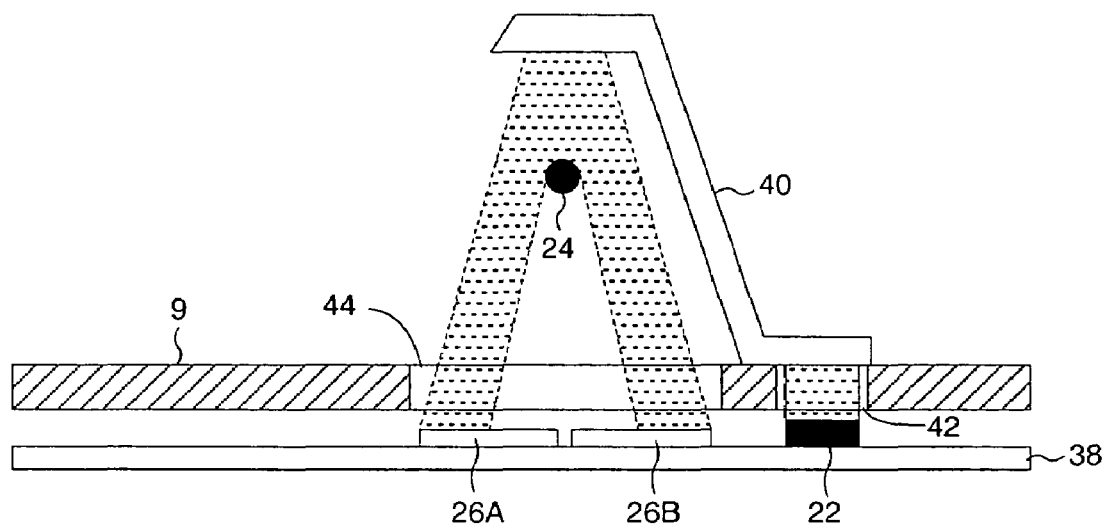
FIG. 8 shows an embodiment of the present invention wherein the light source comprises a light pipe, and the HDA comprises two windows.

FIG. 8 shows yet another embodiment of the present invention wherein the light source comprises a light emitting device 22 and a suitable light pipe 40 (e.g., a fiber optic). The light emitted by the light emitting device 22 passes through a first window 42 in the base 9 of the HDA, and is directed from one end of the light pipe 40 to the other end. The light then shines toward the light sensitive sensors 26A and 26B with appropriate shading by the opaque element 24. In this embodiment, the light passes through a second window 44 in the HDA before reaching the light sensitive sensors 26A and 26B located outside of the HDA.

Figure 9A:
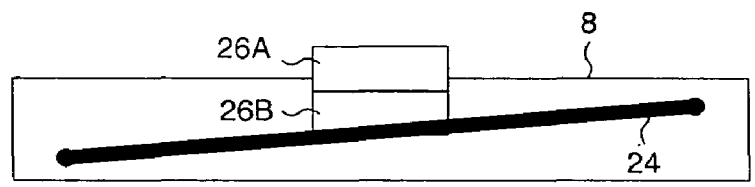
FIGS. 9A-9C illustrate an alternative embodiment of the present invention wherein the opaque element controls an amount of light one of the light sensitive sensors detects.
Figure 9B:
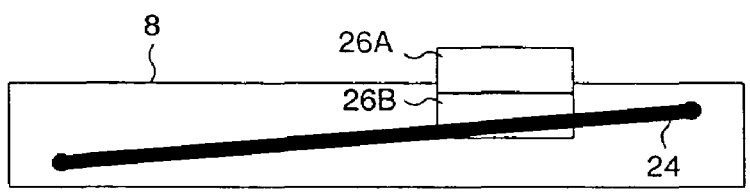
Figure 9C:

FIGS. 9A-9C illustrate another embodiment of the present invention wherein the opaque element 24 is configured to control the amount of light received only by the bottom sensor 26B. When the actuator arm 8 is near the middle of its stroke, as shown in FIG. 9A, the opaque element covers a predetermined area of the bottom sensor 26B. As the actuator arm 8 rotates toward the OD as shown in FIG. 9B, more of the opaque element 24 covers the bottom sensor 26B, and as the actuator arm 8 rotates toward the ID as shown in FIG. 9C, less of the opaque element 24 covers the bottom sensor 26B. In this embodiment, the output from both light sensitive sensors 26A and 26B may be used to control the intensity of the light in an AGC loop, for example, using the differential amplifier 28 shown in FIG. 5A.

Figure 10B:
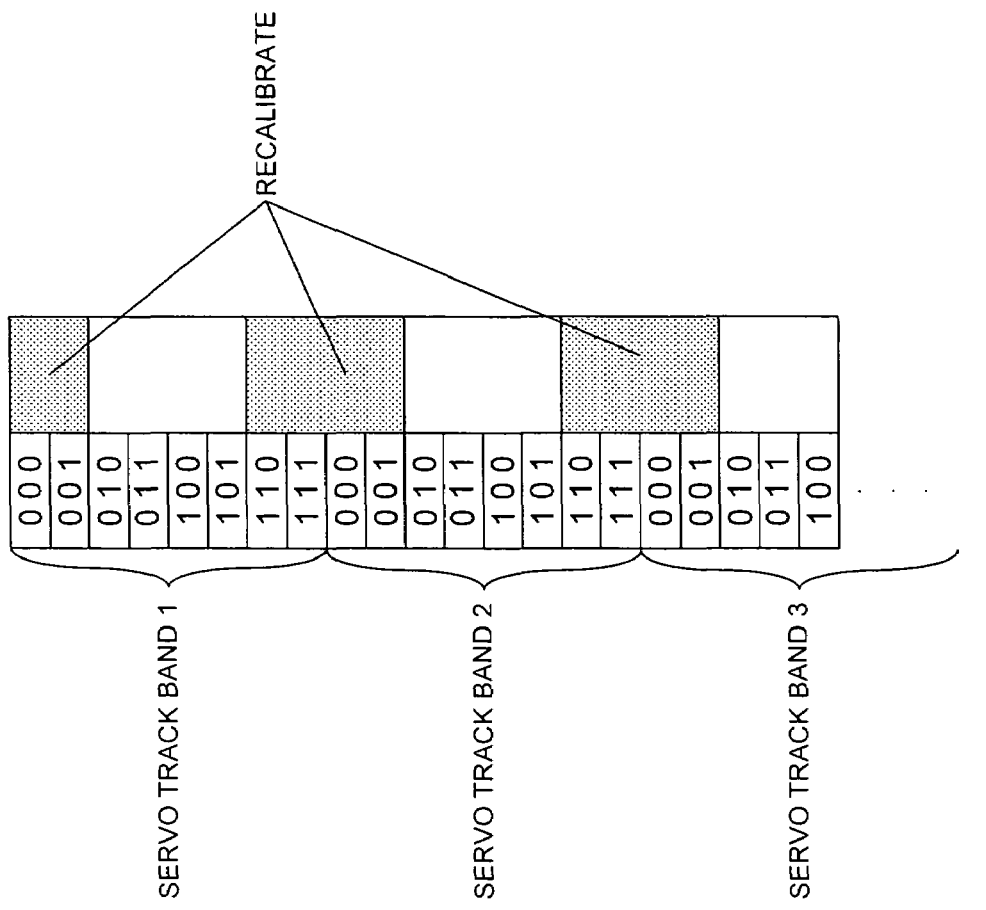
FIG. 10B shows an embodiment of the present invention wherein the control circuitry identifies margin bands used to recalibrate the mechanical position sensor.
Figure 10A:
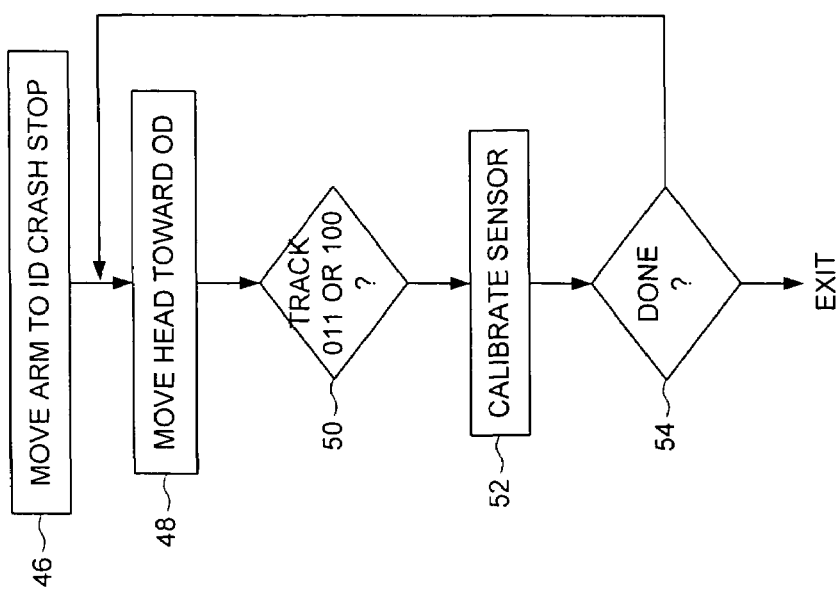
FIG. 10A is a flow diagram executed by the control circuitry for calibrating the mechanical position sensor by reading the fine track addresses in the servo sectors while moving the head radially over the disk.

In one embodiment, the mechanical position sensor 20 is calibrated for each disk drive to compensate for manufacturing tolerances as well as operating drift. FIG. 10A is a flow diagram executed by the control circuitry 35 for calibrating the mechanical position sensor 20 by reading the fine track addresses in the servo sectors while moving the head 6 radially over the disk 2. At step 46 the control circuitry 35 applies a control signal to the voice coil motor 43 in order to move the actuator arm 8 until it contacts the inner diameter crash stop. In an alternative embodiment, a number of reference tracks each comprising a complete servo track address are recorded at the inner diameter of the disk, and the control circuitry 35 positions the head 6 over the reference tracks at step 46. At step 48 the control circuitry 35 moves the head 6 toward the outer diameter of the disk 2 by servoing on the fine track addresses. When the head 6 detects fine track address 011 or 100 of the current servo track band at step 50, then at step 52 the position signal generated by the mechanical position sensor 20 is processed to calibrate the mechanical position sensor 20. In one embodiment, the control circuitry 35 estimates a transfer function (e.g., a polynomial) that correlates the output of the mechanical position sensor 20 with the radial position of the head 6. In an alternative embodiment, the control circuitry 35 simply saves the position signal generated by the mechanical position sensor 20 when the head 6 is positioned over the middle of each servo track band (over fine track address 011 or 100). The flow diagram of FIG. 10A is repeated at step 54 until the head 6 has moved over the entire radius of the disk and the mechanical position sensor 20 calibrated for each servo track band.

In one embodiment, during a seek operation the control circuitry 35 attempts to seek the head 6 to the middle of a target servo track band by moving the head 6 until the output of the mechanical position sensor 20 equals the output corresponding to the calibration process of FIG. 10A. Once the head 6 reaches the target servo track band, the control circuitry 35 positions the head 6 over the target servo track by processing the fine track addresses recorded in the servo sectors. In an embodiment illustrated in FIG. 10B, the control circuitry 35 identifies a margin band at the ends of each servo track band. Referring to FIG. 10B, if the output of the mechanical position sensor 20 matches the output corresponding to the calibration process (i.e., an output corresponding to a central servo track of a servo track band), but the fine track address detected by reading the servo sectors identifies a servo track within one of the margin bands, it means that the mechanical position sensor 20 or other components of the disk drive have drifted. For example, components of the mechanical position sensor 20 or components of the disk drive such as the disk 2 may expand during normal operation due to an increase in temperature. When operating drift is detected (by detecting an error between the expected position of the head 6 as determined from the output of the mechanical position sensor 20 and the actual position of the head as determined from the fine track addresses), the mechanical position sensor is recalibrated, for example, by re-executing the flow diagram of FIG. 10A. In one embodiment, the operating drift of the mechanical position sensor 20 is continuously monitored during both seeking and tracking to detect when the mechanical position sensor 20 should be recalibrated.

Recalibration can be a continuous function performed in the background during normal drive operation, for example, during a seek or tracking operation while executing a disk access command (read/write command). By recording sensor drift as a function of time, the DC or low frequency drift of the mechanical position sensor 20 can be calculated by continuously comparing the fine track address information with the expected value from the mechanical position sensor 20. A calibration constant can then be adjusted with the difference between the expected and observed output values of the mechanical position sensor 20. Tight gain control of the mechanical position sensor 20 is supplied by the AGC loop. If mechanical components of the optical path do not change significantly over time, the averaging effect of the mechanical position sensor 20 creates a very steady output versus head position; alternately, if mechanical stability is not acceptable, gain can be adjusted by comparing observed gain from the burst information obtained from normal fluctuations of the head position over time, against the observed slope of the mechanical position sensor 20.

Figure 11:
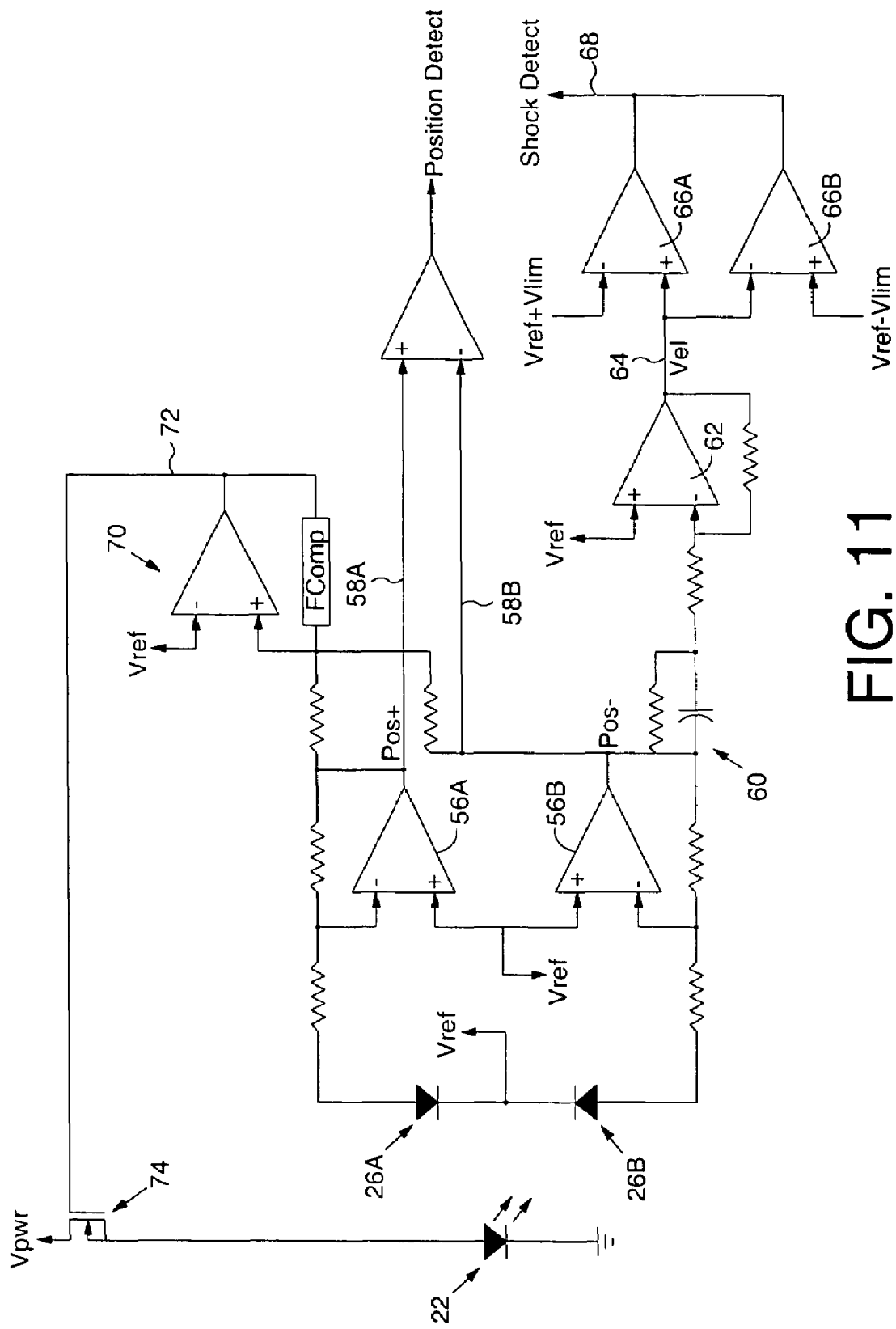
FIG. 11 shows circuitry according to an embodiment of the present invention for detecting a physical shock to the disk drive using the mechanical position sensor.

During read/write operations (particularly during write operations) it is important to detect physical shocks to the disk drive (e.g., a rotational shock) that may perturb the position of the actuator arm 8. For example, a rotational shock to the disk drive may cause the head 6 to skip across a current servo track band to an adjacent servo track band during a tracking operation. This gross deviation during tracking may be undetected when reading the fine track addresses in the servo track bands since the fine track addresses are replicated across the servo track bands. Present state of the art uses a large increase in the number of servo wedges, such that the largest possible shock cannot possibly move the head off track far enough to write data into adjacent tracks during a single sample period. This often doubles the number of servo sectors required, substantially reducing the total disk capacity. Therefore, in one embodiment the control circuitry 35 comprises suitable circuitry for detecting a shock event in response to the mechanical position sensor 20. FIG. 11 shows shock detection circuitry according to an embodiment of the present invention for generating a shock detect signal if the velocity of the actuator arm 8 exceeds a predetermined threshold. The circuitry of FIG. 11 operates in continuous time so that the shock events are detected independent of other control circuitry (e.g., independent of a microprocessor or other digital circuitry). This embodiment helps ensure shock events are monitored continuously so that appropriate action can be taken whenever a shock event is detected. In one embodiment, the control circuitry 35 disables a write operation if a physical shock is detected, for example, by disabling the write signal applied to the head 6 to prevent the head 6 from overwriting the wrong data sector. The continuous nature of the shock detection process reduces the sampling burden on the burst position detection system, thus allowing the number of servo sectors to be reduced substantially. It also reduces or eliminates the need for separate shock sensor systems.

Referring again to FIG. 11, the output of the light sensitive sensors 26A and 26B are compared to a reference voltage by analog amplifiers 56A and 56B to generate a first position signal Pos+ 58A and a second position signal Pos− 58B representing the position of the actuator arm 8 with respect to the outer and inner diameter of the disk 2, respectively. A resistor and capacitor network 60 form an analog differentiator for computing a derivative of the estimated position Pos− 58B in continuous time. An inverting amplifier 62 generates an estimated velocity Vel 64 representing a velocity of the actuator arm 8 that is compared to a reference voltage at comparators 66A and 66B. If the estimated velocity Vel 64 exceeds the reference voltage, a shock detect signal 68 is activated. The control circuitry of FIG. 11 further comprises an amplifier 70 for amplifying the sum of the position signals Pos+ 58A and Pos− 58B to generate an AGC control signal 72. The AGC control signal 72 drives a transistor 74 to control the amount of light emitted by the light source 22. The AGC control signal 72 compensates for mechanical anomalies in the light path, sets total circuit gain to the desired value, and compensates for component drift and aging.

I claim:

1. A disk drive comprising:
   (a) a disk comprising a plurality of servo sectors having servo bursts for defining a plurality of servo tracks, wherein:
      the servo tracks are banded together to form a plurality of servo track bands; and
      each servo sector comprises a fine track address that identifies one of the servo tracks;
   (b) an actuator arm;
   (c) a head attached to a distal end of the actuator arm operable to generate a read signal by reading the disk;
   (d) a mechanical position sensor operable to detect a coarse position of the actuator arm; and
   (e) control circuitry operable to:
      process the coarse position to identify one of the servo track bands;
      process the read signal to detect one of the fine track addresses, wherein the detected fine track address identifies a servo track within the identified servo track band; and
      combine the identified servo track band with the detected fine track address to generate a servo track address.

2. The disk drive as recited in claim 1, wherein the mechanical position sensor comprises an optical sensor.

3. A method of operating a disk drive, the disk drive comprising a disk comprising a plurality of servo sectors having servo bursts for defining a plurality of servo tracks, wherein:
   the servo tracks are banded together to form a plurality of servo track bands; and
   each servo sector comprises a fine track address that identifies one of the servo tracks;
the disk drive further comprising an actuator arm, a head attached to a distal end of the actuator arm operable to generate a read signal by reading the disk, and a mechanical position sensor operable to detect a coarse position of the actuator arm, the method comprising the steps of:
   processing the coarse position to identify one of the servo track bands;
   processing the read signal to detect one of the fine track addresses, wherein the detected fine track address identifies a servo track within the identified servo track band; and
   combining the identified servo track band with the detected fine track address to generate a servo track address.

4. The method as recited in claim 3, wherein the mechanical position sensor comprises an optical sensor.

* * * * *